United States Patent [19]
Hamilton

[11] Patent Number: 5,872,616
[45] Date of Patent: Feb. 16, 1999

[54] METHOD OF PRINTING FRAME NUMBERS FROM DX-CODED PHOTOGRAPHIC FILM

[75] Inventor: Cassie L. Hamilton, Rochester, N.Y.

[73] Assignee: Eastman Kodak Company, Rochester, N.Y.

[21] Appl. No.: 734,827

[22] Filed: Oct. 22, 1996

[51] Int. Cl.⁶ .............................. G03B 27/52; G03B 17/24
[52] U.S. Cl. ............................................. 355/40; 396/311
[58] Field of Search ................................. 355/40, 41, 18, 355/27, 28, 75, 77; 396/311

[56] References Cited

U.S. PATENT DOCUMENTS

| 4,823,163 | 4/1989 | Rollet et al. | 355/41 |
| 4,906,854 | 3/1990 | Rauh et al. | 250/561 |
| 4,914,471 | 4/1990 | Saeki et al. | 355/40 |
| 4,918,484 | 4/1990 | Ujiie et al. | 355/41 |
| 4,947,205 | 8/1990 | Bender et al. | 355/41 |
| 4,965,628 | 10/1990 | Olliver et al. | 355/41 |
| 5,128,519 | 7/1992 | Tokuda . | |
| 5,212,367 | 5/1993 | Takenaka . | |
| 5,504,549 | 4/1996 | Kazami et al. | 354/173 |
| 5,671,452 | 9/1997 | Seikai | 396/318 |

FOREIGN PATENT DOCUMENTS

| 0 364 991 A2 | 10/1989 | European Pat. Off. . |
| 56-128933 A | 10/1981 | Japan . |

Primary Examiner—David M. Gray
Assistant Examiner—Hung Henry Nguyen
Attorney, Agent, or Firm—Francis H. Boos, Jr.

[57] ABSTRACT

In a photoprinter having a bar code reader, a method is provided of automatically assigning a reference frame number to the last bar code on a film order. The reference number is the highest frame number associated with the detected film order length. The method includes a determination that the last bar code read is within specified distance from the end of the film order to ensure that it is, in fact, the last bar code on the order so that the position of the reference frame number is correctly determined. Once the reference frame number and its position is determined, a known frame number assignment algorithm is employed to map out the remaining frame numbers to the image frame notch locations on the film order.

7 Claims, 2 Drawing Sheets

METHOD OF PRINTING FRAME NUMBERS FROM DX-CODED PHOTOGRAPHIC FILM

FIELD OF THE INVENTION

This invention relates generally to the field of photography, and in particular to a method of assigning frame numbers to image frames on film of the type bearing edge-printed bar codes that do not contain frame numbers so as to allow the printing of frame numbers on photographic prints produced from such film.

BACKGROUND OF THE INVENTION

Latent image bar codes are exposed onto most currently produced 35 mm film. A DX bar code, in use for many years, is repetitively exposed at a fixed pitch corresponding to half frame intervals along one edge of the film and contains encoded information pertaining to what are referred to as product and gen (generation) codes that uniquely identify the film type and its production source. In the late 1980's, Fuji Photo Film, Ltd., introduced a film that incorporated a dedicated frame number bar code on the opposite edge of the film from the DX coded edge. This machine readable code allowed photofinishers to automatically determine frame numbers for each image frame that could then be printed on the processed photographic prints. At about the same time, an improved version of the DX code was developed by Eastman Kodak Company, assignee of the present invention, which, as disclosed in commonly assigned U.S. Pat. No. 4,965,628, embeds a frame number code within an extended version of the standard DX code. This new code is generally referred to as a DXN code. It has the advantage that, in addition to providing frame numbers for automatic printing of frame numbers on photoprints, it allows reading the frame number with existing bar code readers, thereby avoiding the need for a separate reader at the opposite edge of the film. Such an arrangement leaves the opposite edge of the film free for exposure of human readable information in alpha or alpha-numeric form.

It is known practice in commercially employed photo-printer equipment, such as represented by the CLAS35 high speed printer made and sold by Eastman Kodak Company, to assign frame numbers to image frame notch locations on a film order. The phrases "film order" and "film strip" are synonymous and are used interchangeably herein. The process employed is based on determining a frame number from the DXN code for one notch location on the film order and then using this as a reference position from which frame numbers can be calculated for the remaining notch locations on the order. The algorithm for this is as follows:

$$\text{Notch Frame No.} = Ref BC \text{FrameNo.} + \frac{Ref BCPos - \text{Notch } Pos}{BC\text{Pitch}}$$

In this process, with reference to FIG. 2, when a bar coded frame number 35 is validly read, e.g. bar code 35a corresponding to half frame number 01A, the frame number and position of the bar code is captured. This becomes the reference bar code frame number. The frame number for each notch 16 is then determined by subtracting the position of the notch in question from the position of the reference bar code, dividing by the pitch 37 between adjacent bar codes and then adding (or subtracting) the resultant member, rounded to the nearest integer number, to the reference bar code frame number. The result is the assignment of the frame number (01) nearest to the notch 16a as the number for the corresponding image frame 17. Because, by convention, there are two alpha-numeric, half-frame numbers 40,41 for each full frame position, e.g. 22 and 22A, the processor, for algorithm purposes, assigns sequential decimal equivalent numbers to the half-frame numbers such that half-frame 22 becomes decimal frame number 44, half-frame 22A becomes decimal frame number 45, etc. Prior to actual printing of the frame numbers on resultant photographic prints, the decimal frame numbers are converted back to human readable alpha-numeric numbers. It will be appreciated from this description that this process is dependent on being able to read a frame number in the bar code to establish the reference bar code frame number.

The capability of automatically associating bar coded frame numbers with photoprints is a highly desirable feature offering for photofinishers. There remains, however, a substantial usage of DX coded film which does not allow this feature to be employed using existing bar code reader equipment. There is the possibility that an additional alpha numeric optical character reader may employed by the photoprinter, such as is disclosed in U.S. Pat. No. 4,823,163, to directly read the alpha numeric frame numbers that are also optically exposed at the edges of the film. The added cost and complexity of this added mechanism makes this approach very undesirable for the highly competitive and cost conscious photofinishing industry. Accordingly, there is a need for provision of the capability for existing photofinishing equipment employing bar code readers to perform automatic identification of image frame numbers on DX coded film so as to provide for automated printing of frame numbers on resulting photoprints.

SUMMARY OF THE INVENTION

According to an aspect of the invention, therefore, there is provided a method of automatically assigning a reference frame number to a frame on a photographic film order bearing machine-readable codes that do not contain film frame numbers, wherein the method comprises determining the length of the film order assigning to the last frame on the film strip a reference frame number that corresponds to the highest frame number associated with film orders of the determined length.

According to a further aspect of the invention, there is provided a method of determining film frame numbers for a photographic film order bearing bar codes that do not contain frame numbers in a photographic printing system adapted to calculate frame numbers based on positions of frame location notches relative to a determined reference frame number, wherein the method comprises the steps of advancing a film order bearing such bar codes through an optical bar code reader; measuring actual length of the film order; providing a range of minimum and maximum film order lengths for at least one standard film order size; and determining if the measured film order length is within the range of order lengths. Further steps in this aspect of the invention include determining an actual number of bar codes validly read on the film order; providing a range of minimum and maximum range of bar code counts for the standard film order size; and determining if the actual bar code count is within the range of bar code counts. Finally, in this aspect of the invention, for film orders producing affirmative response to the film length and actual bar code count range determining steps, assigning the highest frame number corresponding to the film order size to the notch nearest to the last bar code detected on the film order.

Preferably, in this latter aspect of the invention, the method includes the additional step of determining whether the last bar code detected on the film order is within a predetermined distance from the end splice of the order, wherein the step of assigning the highest frame count is employed only if the last detected bar code is within the predetermined distance.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
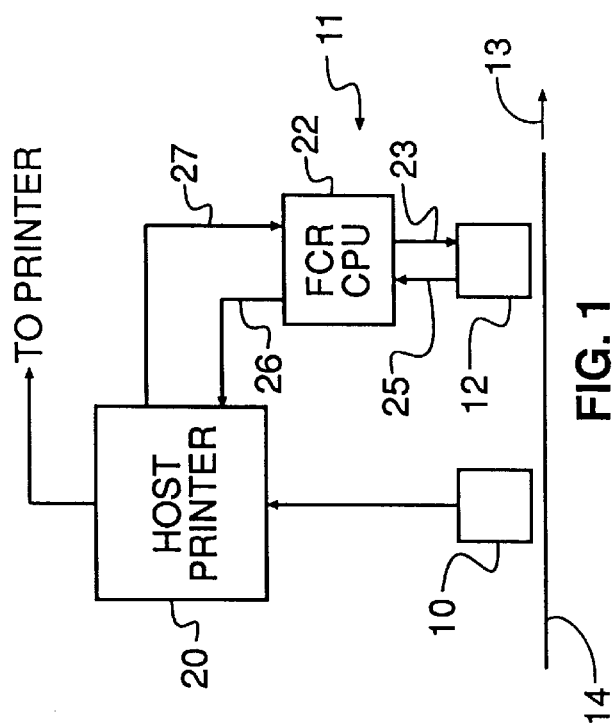
FIG. 1 is a schematic block diagram of portions of film scanning apparatus employed in performing the method of the invention.
Figure 2:
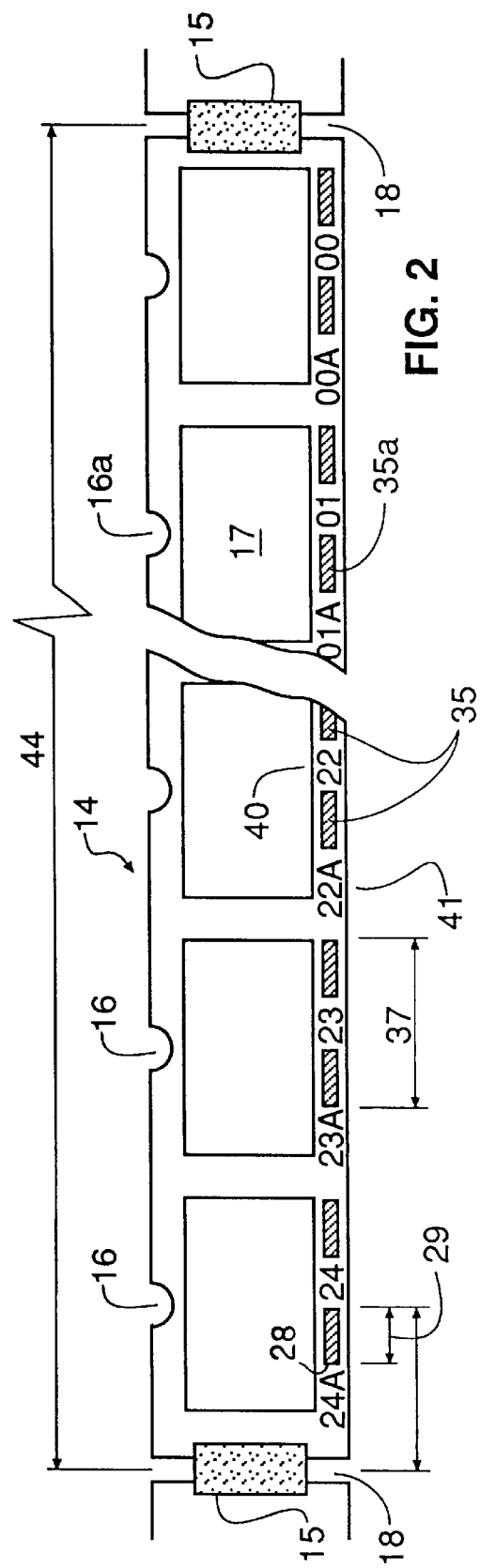
FIG. 2 is a diagram of a film strip illustrating the principles of the invention.

Referring now jointly to FIGS. 1 and 2, film scanning apparatus employed in the method of the invention includes a film notch and splice detector 10 and a film code reader 11. Detector 10 comprises a photo-optical sensor that outputs a signal each time there is detected a film frame notch 16 or a splice 18 that separates successive film strips 14 which are spliced together by an adhesive strip 15. The signals from detector 10 are sent to a host computer 20. The film code reader 11 comprises a CCD sensor 12 spaced a known distance from the detector 10 in the direction of the travel of a film strip 14 through the scanning apparatus as shown by arrow 13. Sensor 12 outputs on line 25 to a film code reader CPU 22 analog signals derived from the bar code images 35 on the film 14. The FCR CPU 22 includes a clocking counter that clocks the line scanning operation of the CCD sensor via a clocking line 23. The clocking counter provides a convenient mechanism establishing location values for specific physical features, referred to as events, occurring on the film strip. These events are frame notches 16, film splices 18 and bar codes 35. The analog signals from the CCD sensor 12 are digitized, decoded and stored as product and gen code data in the FCR CPU along with the corresponding location value for each bar code. The bar code location values and the corresponding bar code data are periodically sent via line 26 to the host computer to be stored in memory as an event table. The location value for each bar code may be the actual value of the location of a known datum point 28 in the bar code, such as the start sentinel of the code, or, it may be an interpreted value based on a fixed distance 29 between the bar code datum point and an average central position of an associated human readable, alpha-numeric frame number. Additionally, host computer 20 delivers delayed notch/splice signals on line 27 to the FCR/CPU 22 which responds to the host computer on line 26 with the corresponding line counter location value for the notch or splice for storage in the event table memory. The resultant event table thus comprises a complete map of the location of each event on a film order: namely, beginning and ending splices, film frame notches and bar codes, and also a data store representing the decoded bar code information. For DXN bar codes, this stored data would also include the frame number of each bar code, while for DX bar codes, these frame number table memory locations are necessarily empty.

Figure 3:
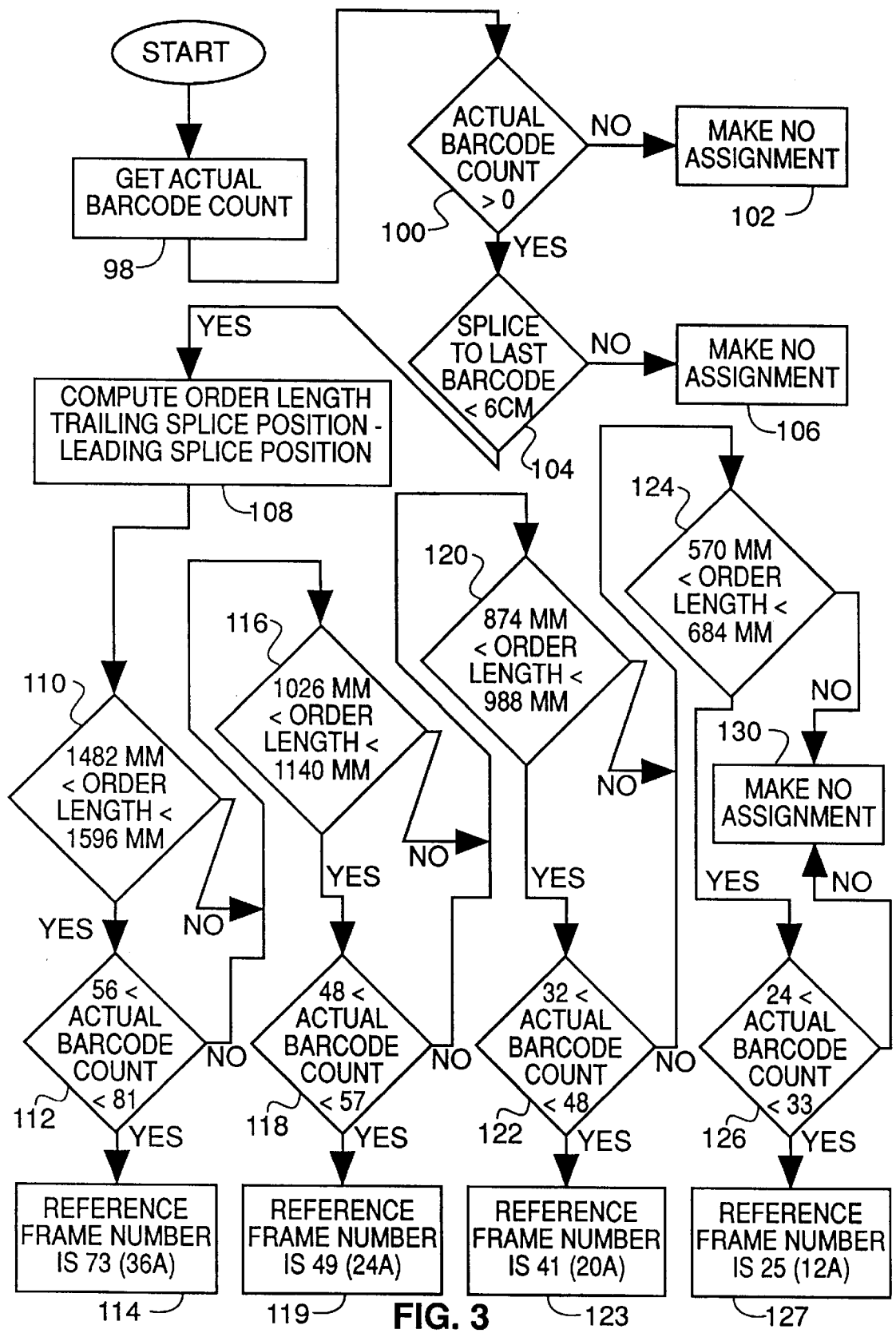
FIG. 3 is a program flow chart illustrating the method of the invention.

Having described an embodiment of apparatus useful in practicing the invention, reference is now made to FIG. 3 which shows a program flow diagram illustrating the operation of the method of the invention. When the event table for a film order has been completed, the host computer 20 is programmed in accordance with the illustrated flow chart to determine and assign a reference frame number to the last bar code detected in the film order. In order to do this, it is necessary for the last detected bar code to meet certain qualifying criteria in order to establish its validity as being the last bar code on the film strip in order for the reference number to be assigned. Once this reference frame number is assigned to the last bar code, it is then possible to use the existing frame number algorithm described above to assign frame numbers to each film frame notch location. Thus the method illustrated in FIG. 3 is directed to the identification, location and verification of the last-read bar code and the assignment of a reference frame number, actually the highest frame number corresponding to the determined film order size, to this last detected bar code.

Upon entering this program routine, step 98 obtains the actual bar code count. At step 100, it is determined whether the actual number of detected bar codes is greater than "0" in order to determine that the film order does contain bar codes and that the film code reader has been able to read them. If no bar codes have been detected, it is not possible to assign frame numbers to prints and therefore the program is exited at step 102. If bar codes have been detected, the location of the last read bar code in the event table is compared at step 104 to the location of the end splice to determine if the last detected bar code is within a predetermined distance from the end of the film order. This is to ensure that the last valid read of a bar code on the film order is, in fact, the last bar code on the film order. If this is not the case, the program exits at step 106 without making a frame number assignment. For practical reasons, this distance is selected to be 6 cm although other distances may be employed. Since the physical location of events on the film is stored as CCD line scan counts, the comparison may actually be made against a threshold difference value between event locations since, for a given film advance speed, there is a fixed relationship between line counts and film travel distance.

Assuming a valid last bar code has been read, step 108 computes the length 44 of the film order from location values of the beginning and end splice locations. Step 110 then determines if the calculated order length falls within a range of minimum and maximum order lengths for a predetermined standard film order size (in frame numbers). A range of order lengths is employed to accommodate variation and film lengths due to film manufacturing and film processing. In the case of step 110, the range of lengths corresponds to a nominal film strip size of 36 full size frames. If the film order length falls within this range, step 112 determines if the actual bar code count falls within a range of possible bar code counts for a 36 frame film order. If the result of step 112 is affirmative, step 114 then assigns the highest frame number to the last bar code, in this case decimal frame number 73. Once this is done, the program then moves to the frame number assignment routine described above in which the frame number closest to each film frame notch is assigned to the image frame corresponding to that notch location.

If either of the steps 110 or 112 gives a negative result, the program iterates this two step process through steps pairs 116,118; 120,122; and 124,126 for successively smaller film order sizes, namely 24 frame, 20 frame and 12 frame film order size, and when an appropriate match is determined, the corresponding highest frame number is assigned to the last bar code, by respective steps 119, 123, or 127, followed by the aforementioned frame number to notch location routine. If no match is found, the program exits at step 130 with no frame number assignment being made.

It will be appreciated that what has been described is a simple and reasonably accurate technique for automatically assigning frame numbers to DX coded film orders by effectively assigning an appropriate reference frame number to the last bar code in the film order. This reference frame number assignment then allows an existing frame number assignment routine to complete the assignment of frame numbers to actual notch locations on the film order.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | splice detector |
| 11 | film code reader |
| 12 | CCD sensor |
| 13 | arrow |
| 14 | film strip |
| 15 | adhesive strip |
| 16 | film frame notch |
| 18 | film splice |
| 20 | host computer |
| 22 | film code reader CPU |
| 23 | clocking line |
| 24 | bar code image |
| 25 | CCD output line |
| 26,27 | serial communication lines |
| 28 | bar code datum point |
| 29 | fixed distance between bar code and alpha-numeric frame no. |
| 35 | bar codes |
| 37 | pitch between bar codes |
| 36 | full size frames |
| 40,41 | frame number |
| 44 | film order length |
| 98–130 | program flow chart steps |

What is claimed is:

1. A method of automatically assigning a reference frame number to a frame on a photographic film order bearing machine-readable codes that do not contain film frame numbers, the method comprising:

determining the length of the film order; and assigning to the last frame on the film order a reference frame number that corresponds to the highest frame number associated with film orders of the determined length.

2. The method of claim 1 wherein said film order length is determined by measurement of distance between beginning and end splice positions of the film order.

3. The method of claim 1 wherein the position of each frame on the film order is established by a notch at a fixed position relative to the frame associated with the notch; the reference frame number is assigned to the notch nearest to the reference frame number and remaining frame numbers are assigned to remaining notches on the film strip based upon pitch distance between adjacent bar codes on the film strip.

4. A method of determining film frame numbers for a photographic film order bearing bar codes that do not contain frame numbers in a photographic printing system adapted to calculate frame numbers based on positions of frame location notches relative to a determined reference frame number, the method comprising the steps of:

advancing a film order bearing said bar codes through an optical bar code reader;

measuring actual length of the film order;

providing a range of minimum and maximum film order lengths for at least one standard film order size;

determining if said measured film order length is within said range of order lengths; and for film orders producing an affirmative response to said last mentioned determining step, assigning the highest frame number corresponding to said film order size to the notch nearest to the last bar code detected on the film order.

5. The method of claim 4 further including the steps of:

determining an actual number of bar codes validly read on the film order;

providing a range of minimum and maximum range of bar code counts for said standard film order size;

determining if the actual bar code count is within said range of bar code counts; and employing said step of assigning said highest frame number only when both said measured film order length and said actual bar code count are within said respective minimum and maximum ranges corresponding to said standard film order size.

6. The method of claim 4 wherein said film length is determined by measuring the distance between splice positions at the beginning and end of the film order.

7. The method of claim 4 wherein said film order has a beginning and an end splice and further including the step of determining whether the last bar code detected on the film order is within a predetermined distance from said end splice, and employing said step of assigning said highest frame count only if said last detected bar code is within said predetermined distance.

* * * * *